G. CUPPERS.
Mechanism for Operating Sewing Machines.
No. 73,303.
Patented Jan'y 14, 1868.
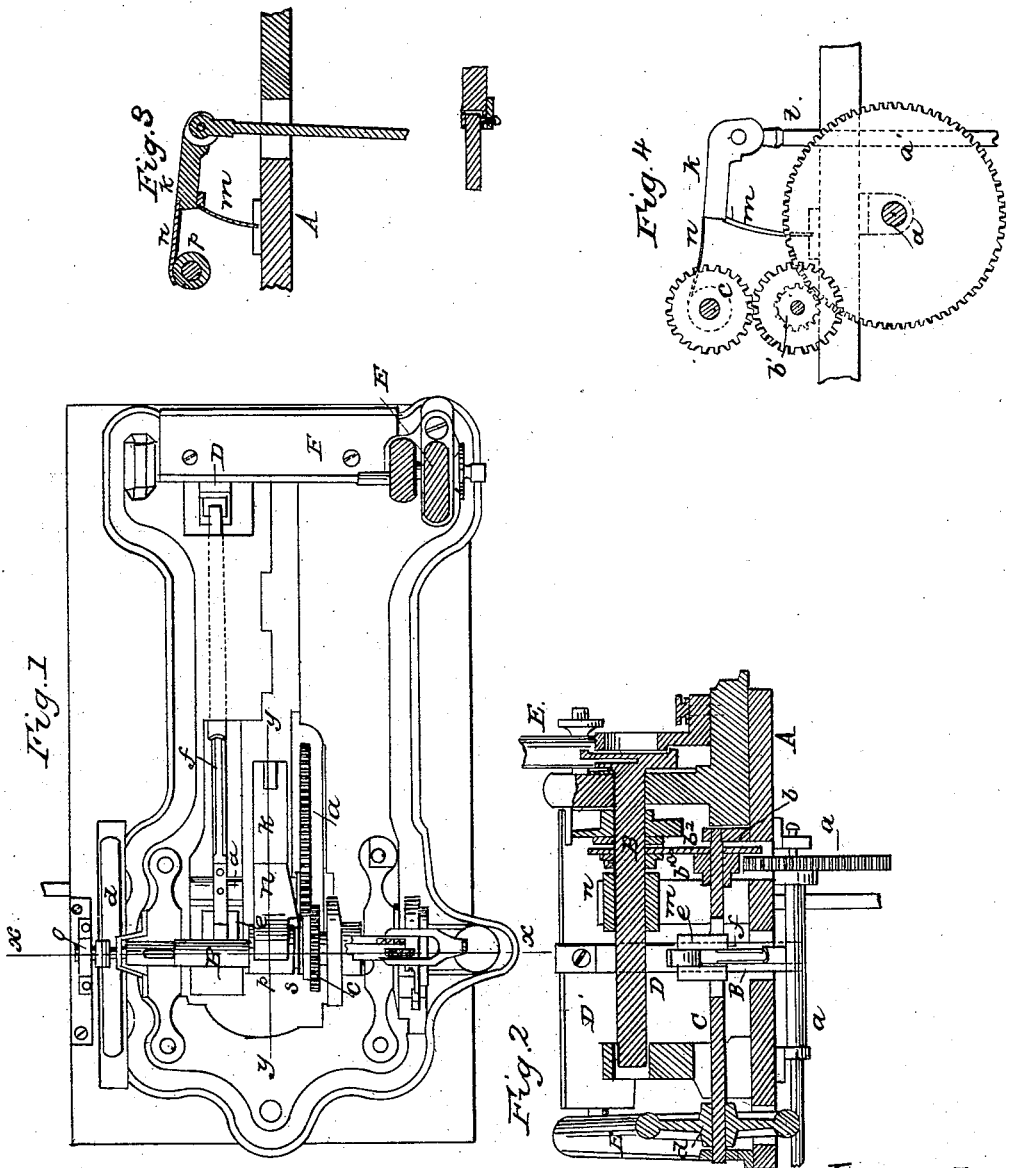

UNITED STATES PATENT OFFICE.

GUSTAVUS CUPPERS, OF NEW YORK, N. Y.

IMPROVEMENT IN MECHANISMS FOR OPERATING SEWING-MACHINES.

Specification forming part of Letters Patent No. 73,303, dated January 14, 1868.

*To all whom it may concern:*

Be it known that I, GUSTAVUS CUPPERS, of New York, in the county and State of New York, have invented certain new and useful Improvements in Mechanism for Automatically Operating Sewing-Machines; and I hereby declare the following to be a full, clear, and exact description of the same, reference being had to the accompanying drawings, in which—

Figure 1 is a top view of a machine to which my improved mechanism is applied. Fig. 2 is a section of the same on the line $x\ x$, Fig. 1. Fig. 3 is a section through the spring-brake and parts with which it is connected on the line $y\ y$, Fig. 1. Fig. 4 is a side elevation of a detached portion of the mechanism, showing the arrangement of the gearing and spring-brake.

In an application now pending in the United States Patent Office I have described and claimed a method of obtaining power for automatically operating sewing and other machines by the employment of rubber bands or belts, which, after being stretched or wound around the main or driving shaft of the mechanism for imparting the necessary power and speed to the sewing-machine or other machinery, will, by their contractile power, cause the revolution of the shaft and the consequent movement of the machinery.

My present invention has reference more especially to the application of such mechanism to sewing-machines; and its object is to effect such a combination of the needle and other operative parts of the sewing-machine with the said mechanism for actuating the same as to obtain not only the necessary speed, but also the power required to enable the machine to operate to advantage.

To enable those skilled in the art to understand and use my invention, I will now proceed to describe the manner in which the same is or may be carried into effect, by reference to the accompanying drawings.

The machine represented in the drawing, to which my invention is applied, is a Wheeler & Wilson sewing-machine; but it will, of course, be understood the said invention may be applied to any other machine of similar or suitable construction.

Beneath the table A, which supports the machine, a shaft, $a$, is mounted in suitable bearings, and carries the toothed wheel $a'$, by means of which motion is imparted to the operative parts of the sewing-machine. This toothed wheel is connected, by suitable gearing, with the spring-power mechanism described in my pending application for Letters Patent above referred to, and by means of such mechanism is caused to revolve, its motion being arrested by means of a brake constructed and applied in the manner hereinafter described. Immediately beneath the shaft B, which in this machine actuates the shuttle and feed, a crank-shaft, C, is supported in suitable bearings $b\ b$. Upon this shaft is mounted a pinion, $b^1$, which gears with the toothed wheel $a'$, Figs. 2 and 4. Adjoining the pinion is a larger gear, $b^2$, which meshes with a pinion, $c$, upon the shaft B, so that when the wheel $a'$ is caused to revolve the motion is communicated, through the medium of the gears $b^1$, $b^2$, and $c$, to the said shaft B, which, in its turn, imparts the necessary movements to the feeder and hook. The shaft C carries on one end a balance or fly-wheel, $d$, for giving the requisite steadiness and certainty to its movement, and about midway upon the same shaft is the crank $e$, from which the requisite movement is transmitted to the needle-arm. To this end a vertical bar or arm, D, is secured to the portion $D'$ of the vibrating needle-arm which is hung in the standards E in the back part of the machine, the lower end of the vertical arm passing through the frame of the machine, and extending down some distance below the table A, as seen in Fig. 2. A rod, $f$, hinged at one end to the crank $e$, and at the other to the lower end of the arm D, connects the shaft C with the needle-arm, so that when the shaft C is revolved the crank, through the medium of the connecting-rod $f$ and bar D, will effect the requisite vibration of the needle-arm. By this extension of the bar D below the table, and its combination with the crank-shaft, I obtain increased leverage to operate the needle-arm, which is an essential in all sewing-machines actuated by spring-power. In order to counterbalance or compensate for the weight of that portion of the needle-arm which overhangs the table, I attach, by means of screws, to the rear of the part $D^1$ a metal block or weight, F, which serves as a counterpoise for the weight of the overhanging part of the needle-arm, and causes the arm to be nearly, if not quite, balanced upon its pivotal points or bearings in the standards E.

In machines operated by spring-power, the tendency of the needle-arm, where not thus balanced, is to vibrate unevenly, descending with greater rapidity and force than when ascending. Where light fabrics are being operated on in the machine this action is injurious, and often causes the material to be damaged, so that the use of a counterpoise, serving, as it does, to prevent this unequal movement, will enable the material to be operated on to the best advantage. If, however, heavy stuff, such as cloth or leather, are operated on, the needle-arm will require all the power that can be obtained in descending, in order to drive with ease the needle through the fabric, and in such case the weight F can be taken off by removing the screws or other equivalent device by which it is held to the handle D'.

As the mechanism just described is intended to be operated automatically by spring-power, it, of course, becomes necessary to provide some means whereby its motion can be regulated and arrested whenever desired. The means employed by me for this purpose are represented more fully in Figs. 3 and 4 of the accompanying drawings.

In rear of the shaft B is a rod, K, of metal or other suitable material, which is supported in a horizontal position upon an upright plate-spring, m, attached at its upper end to the front end of the bar, and at its base to the table or frame of the machine. Extending out from the front of the rod K, so as to slant at about right angles to the spring m, is another plate-spring, n, the free end of which is bent into a suitable shape to fit upon a cylinder, p, of wood or other suitable material, secured upon the shaft B. These parts are so arranged with relation to the said shaft, that when in their normal positon, as shown in Fig. 3, the spring n shall, by means of the upright spring-plate m, be pressed with force upon the shaft B, to correct the movement which would otherwise be imparted to it from the spring-power mechanism. In order to effectually accomplish this result, a notch or shoulder, r, Fig. 1, is cut in the spring n, against which a small pin or stud, s, on one side of the cylinder p catches when the brake is in the position shown in Fig. 3. A rod, t, is hinged to the rear end of the brake-bar K, and at its lower end is connected with a pedal in any suitable manner.

When the machine is to be put in motion, the pedal is pressed by the foot of the operator, so as to draw down the end of the bar K to which the connecting-rod is hinged, the flexibility or elasticity of the spring-supporting plate m admitting of this movement of the lever. The spring n is consequently lifted and drawn away sufficiently to disengage the stop s, and the shaft B is then left free to revolve. By lessening or increasing the pressure upon the pedal, the brake is caused to press with more or less force upon the shaft, whose motion can thus be regulated so as to cause the needle-bar to vibrate with any desired degree of rapidity, the movement of the shuttle and feed being, by the same means, of course, regulated in a corresponding degree.

Instead of making the springs m n of separate pieces of metal, attached separately to the bar K, they may be formed from a single spring strip or band, bent so that one portion of it shall stand at about right angles to the other, and attached at the point where the angle is formed to the front end of the bar K.

Having now described my invention, and the manner in which the same is or may be carried into effect, what I claim, and desire to secure by Letters Patent, is—

1. The combination and arrangement of the shaft a of the spring-power mechanism with the crank-shaft and connecting-rods for operating the needle-arm, shaft for operating the feed and hook, and brake for regulating the movement of the said parts, in the manner herein shown and set forth.

2. The employment, in connection with the needle-bar, of the movable weight or counterpoise, applied to the said bar, substantially in the manner and for the purposes described.

3. The friction-brake, constructed as herein described, and applied to the shaft for actuating the feeder and shuttle, substantially as shown and set forth.

In testimony whereof I have signed my name to this specification before two subscribing witnesses.

GUSTAVUS CUPPERS.

Witnesses:
　M. BAILEY,
　J. MC. KENNEY.